Nov. 10, 1970   M. DANGAUTHIER   3,539,799
HEADLIGHT
Filed Oct. 24, 1967   2 Sheets-Sheet 1
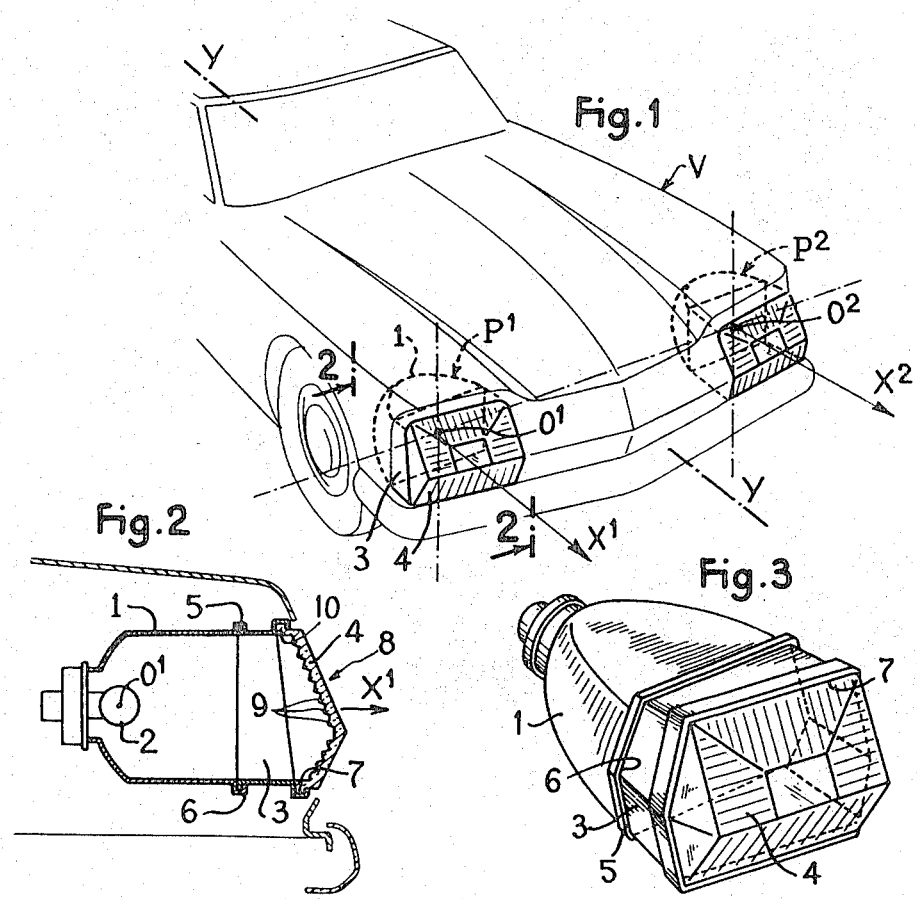
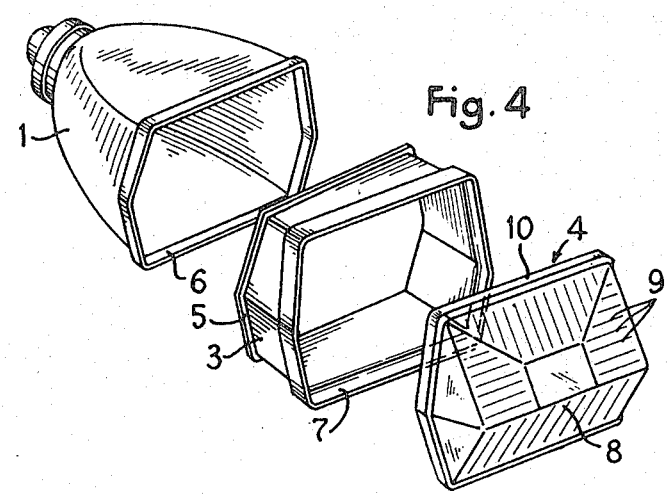

Nov. 10, 1970  M. DANGAUTHIER  3,539,799
HEADLIGHT
Filed Oct. 24, 1967  2 Sheets-Sheet 2
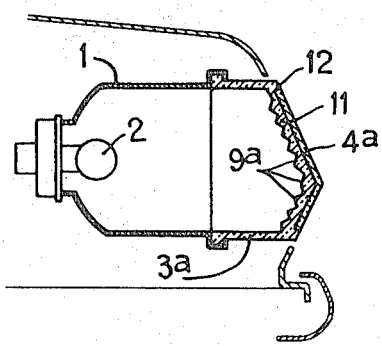
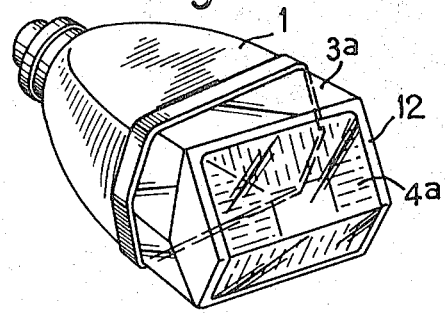
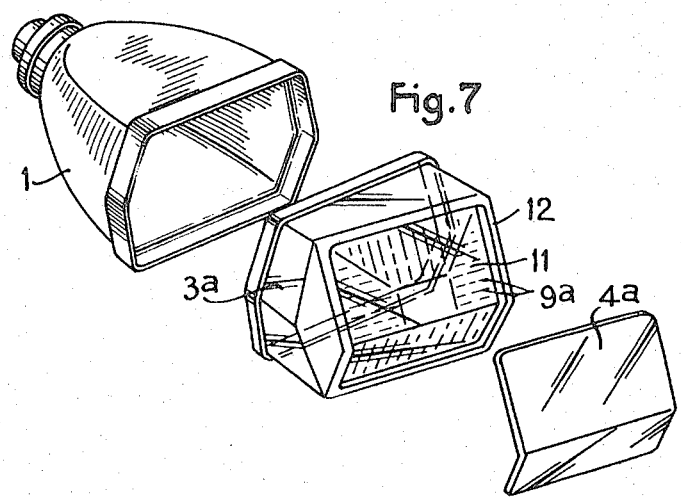

3,539,799
HEADLIGHT
Marcel Dangauthier, Paris, France, assignor to Automobiles Peugeot, Paris, and Regie Nationale des Usines Renault, Billancourt, France, both French body corporates
Filed Oct. 24, 1967, Ser. No. 677,692
Claims priority, application France, Feb. 13, 1967, 94,643
Int. Cl. F21v 7/00, 5/00
U.S. Cl. 240—41.35    2 Claims

ABSTRACT OF THE DISCLOSURE

A headlight for a vehicle having a reflector, a transparent plastic spacer and a thin glass cover. The transparent plastic spacer is mounted on the reflector and has a transverse wall which is provided with optical grooves on its rear face. The front face of the plastic spacer is provided with a peripheral flange in which is mounted the thin glass cover.

---

The present invention relates to headlights for automobile vehicles and more particularly for vehicles having streamlined shapes on each side of the vertical longitudinal median plane of the vehicle.

It is known that such a headlight comprises a rear reflector and a front glass.

In the case of vehicle bodies having streamlined front shapes, it is advantageous to arrange that the headlight also has a shape merging with the outer shape of the body. Now it is obvious that the reflector must have a symmetrical shape so that it can be pressed out under satisfactory conditions. Consequently, a headlight having a shape merging with the outer streamlined shape of the body of the vehicle and thereby improving the appearance and the aerodynamic features, can only be obtained by shaping the front glass. This gives rise to serious difficulties due to the conditions imposed by glass pressing methods.

In particular, it is difficult and expensive to press glasses having a very hollow and a dissymmetrical shape, since the punch undergoes rapid wear owing to cooling difficulties. Moreover, it must be possible to place the glass work-piece on a flat surface after stripping from the mould so as to limit deformations of the glass.

The object of the invention is to overcome these difficulties.

The invention provides a dissymmetrical headlight comprising, in combination, a symmetrical reflector, a spacer element of non-vitreous material applied against the front edge of the reflector which it extends and having a dissymmetrical shape relative to a vertical plane intersecting the optical axis of the reflector, and a relatively thin front/glass wall mounted on said spacer element.

The front surface exposed to abrasion, and only this surface, if therefore of glass. The glass wall constituting this surface can—notwithstanding the problem of shape and aerodynamism which is solved by the spacer element (easily constructed by forming or moulding in a mould)—be of simple shape and it affords a protection against abrasion whereas this front part of the headlight would be very rapidly scratched if it were of plastics material.

The spacer element can be for example of sheet metal, cast metal alloy (such as zamac or a light alloy), or a plastic material, such as a superpolyamide.

According to one embodiment, the spacer element can be a simple sleeve.

According to a modification, the spacer element is of transparent plastics material and comprises a front end wall provided with optical grooves to which a thin glass wall, affording a protection against abrasion, is connected. This wall then consists of a simple window of constant thickness.

Further features and advantages of the invention will be apparent from the ensuing description with reference to the accompanying drawings.

In the drawings:

FIG. 1 is a perspective view of the front end of an automobile vehicle provided with two headlights according to the invention;

FIG. 2 is a vertical longitudinal sectional view on line 2—2 of FIG. 1 intersecting the optical axis of one of the headlights;

FIG. 3 is a perspective view of this headlight;

FIG. 4 is an exploded perspective view of this headlight, and

FIGS. 5, 6 and 7 are respectively similar to FIGS. 2, 3 and 4 and relate to a modification of the headlight according to the invention.

FIG. 1 shows the front end of an automobile vehicle V of modern design, the body having a streamlined shape which is symmetrical relative to the vertical longitudinal median plane of the vehicle.

Set into the body are two headlights $P^1$ and $P^2$ whose axes $O^1$–$X^1$ and $O^2$–$X^2$ are parallel and symmetrical relative to the trace Y—Y of said median plane in a substantially horizontal plane intersecting the optical axes.

Each headlight comprises the combination of a rear reflector 1, a bulb 2, a spacer element 3 and a relatively thin front glass 4.

The reflector 1 is preferably of metal and manufactured by a press operation. It is symmetrical relative to the corresponding optical axis such as $O^1$–$X^1$. The lateral walls of the reflector have the same length parallel to said axis, so that the front edge of the reflector is contained in a plane perpendicular to the longitudinal vertical median plane of the vehicle.

The spacer element 3 constitutes a sleeve which is open at the front and rear ends. It can be of cheap metal, for example cast metal alloy (such as zamac or light alloy), or plastics material such as superpolyamide (Nylon) or polycarbonate moulded in a mould preferably by injection moulding.

The inner surface is polished and can be metallized so as to be reflective in the same way as the reflector and have the same appearance as the latter, which it merely extends.

This spacer sleeve comprises a rear outer flange 5 adapted to be engaged in a groove 6 provided on the front edge of the reflector L, and a front groove 7 adapted to receive the rear edge of the glass 4.

It will be observed that this arrangement, to which it is not intended to limit the invention, permits either a simple press operation or an easy stripping from the mould without complicating the mould.

The wall of this sleeve 3 has a length which varies along the perimeter of the sleeve, its front and rear edges being in planes which are oblique to each other so that the front wall of the glass 4 is oblique relative to the longitudinal plane of symmetry of the vehicle and laterally extends the streamlined shape of the front part of the body 1, this wall 4 merging into this shape by its front face 8.

The glass wall 4 has the general shape of a dihedron or the like. It has a relatively thin wall, its thickness being around 5–8 mm., and its rear face comprises the conventional optical grooves 9 adapted to impart to the optical beam of the headlight the required distribution of light for achieving a good illumination of the road. The wall 4 is provided at its rear base with an outer reinforcing flange or bead 10 which is engaged in the groove 7 of the sleeve 3.

This glass 4 can be pressed out in the conventional manner but it can also be advantageously constructed from a thin piece of glass put into shape in the hot condition (the same method as that employed in the manufacture of windshields), which imparts thereto an improved optical quality.

The glass 4 can be connected to the sleeve 3 by an adhesive and an elastic retaining by the plastics material, or by moulding this plastics material directly onto the glass.

In the case of breakage, the pieces of glass remain attached to the plastics material and do not fall onto the road. In order to still further improve the safety, the glass can be hardened or constructed in the form of two thin sheets of glass between which an adherent plastic film is interposed (triplex method).

FIGS. 5-7 show a modification in which the dissymmetrical spacer element 3$^a$ is of transparent injected plastics material, for example polymetacrylate or polycarbonate, and it has a solid front wall 11 which is slightly set back and includes on its rear face optical grooves 9$^a$ and defines a front ledge 12. The glass 4$^a$ consists of a thin wall having plane faces disposed within said ledge against the front plane faces of the wall 11. The front edge of the spacer element and the front face of the wall 4$^a$ merge into the outer surface of the body.

In the presently-described embodiment, the front wall 12 and the wall 4$^a$ have the shape of a dihedron but it must be understood that this shape is not exclusive. The wall 12 and the wall 4$^a$ could also have a cylindrical shape or any curved shape having a large radius of curvature, the front face of the wall 12 forming a part of the outer face of the body of the vehicle.

Although specific embodiments of the invention have been described, many modifications and changes may be made therein without departing from the scope of the invention as defined in the appended claims.

Having new described my invention what I claim as new and desire to secure by Letters Patent is:

1. A headlight for a vehicle, comprising: a symmetrical reflector having an open front end, a spacer element mounted at said open end of the reflector and having a dissymetrical shape relative to a vertical plane containing the optical axis of the reflector, said spacer element being of transparent plastics material and having a lateral wall which extends the reflector, a front transverse wall provided on its rear face with conventional optical grooves and on its front face with a peripheral flange; and a relatively thin glass attached to said front wall within said peripheral flange.

2. A headlight for a vehicle, comprising a reflector having an open front end, a spacer element mounted at said open end of the reflector and having a dissymmetrical shape relative to a vertical plane containing the optical axis of the reflector, wherein said spacer element is of transparent plastics material and has a lateral wall which extends the reflector, a front transverse wall which is provided on its rear face with conventional optical grooves, and on its front face with a peripheral flange, a relatively thin glass being attached to said front wall within said peripheral flange.

References Cited

UNITED STATES PATENTS

| | | | |
|---|---|---|---|
| 1,652,340 | 12/1927 | Adair | 240—7.1 |
| 1,671,900 | 5/1928 | Irwin | 240—41.35 |
| 3,219,809 | 11/1965 | Bulic | 240—8.2 XR |

FOREIGN PATENTS

| | | | |
|---|---|---|---|
| 712,304 | 7/1954 | Great Britain. | |
| 41,515 | 1/1930 | Denmark. | |
| 337,781 | 3/1936 | Italy. | |

JOHN M. HORAN, Primary Examiner

R. P. GREINER, Assistant Examiner

U.S. Cl. X.R.

240—106